No. 888,921. PATENTED MAY 26, 1908.
W. A. MURRAY & E. M. M. BABBITT.
PIPE MOLDING MACHINE.
APPLICATION FILED AUG. 21, 1907.
2 SHEETS—SHEET 1.
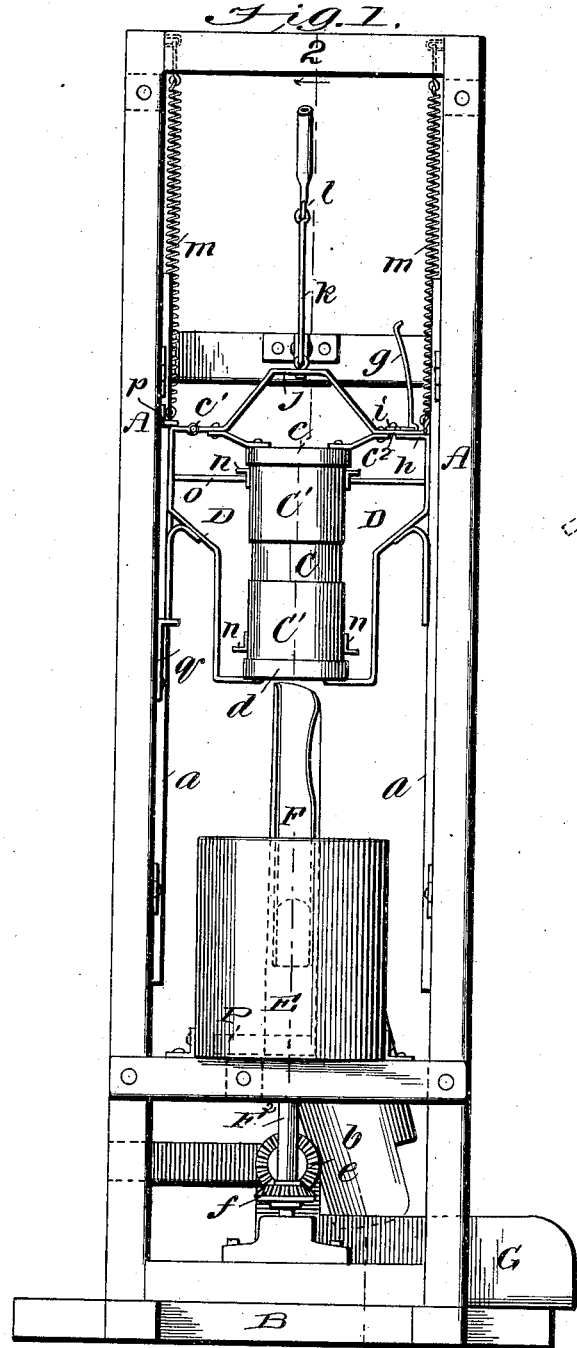
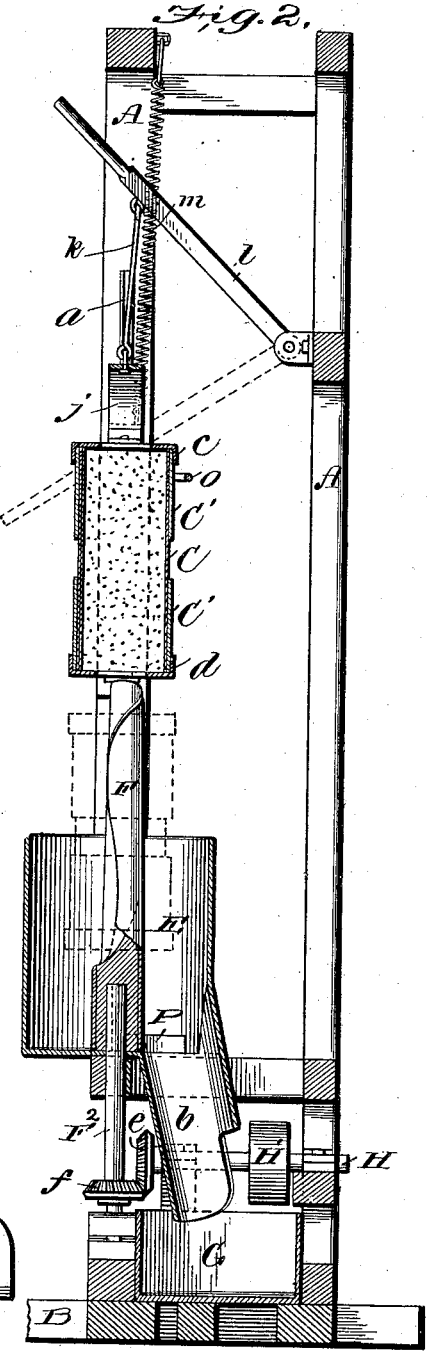
WITNESSES
F. C. Barry
Edw. W. Byrn.
INVENTORS
WILLIAM A. MURRAY
ELLA MAY MURRAY BABBITT
BY Munn & Co
ATTORNEYS.

No. 888,921. PATENTED MAY 26, 1908.
W. A. MURRAY & E. M. M. BABBITT.
PIPE MOLDING MACHINE.
APPLICATION FILED AUG. 21, 1907.
2 SHEETS—SHEET 2.
Fig. 3.
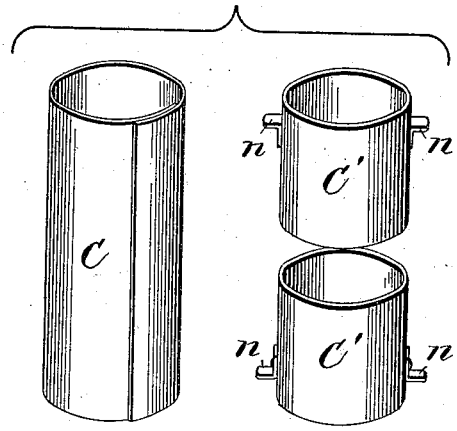
Fig. 4.
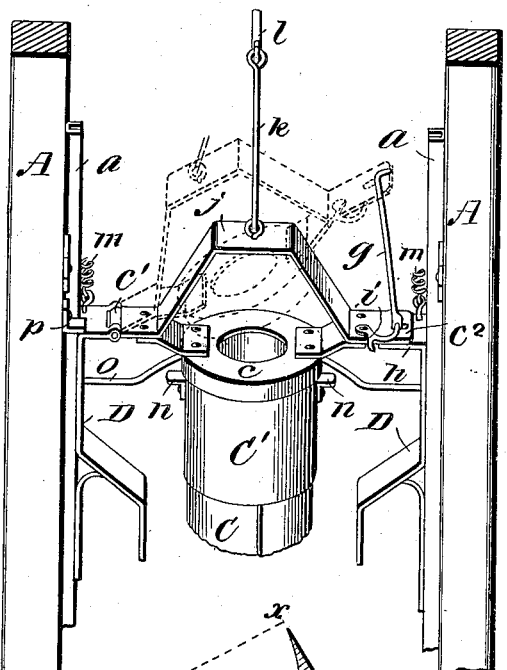
Fig. 5.
WITNESSES
F. C. Barry
Edw. W. Byrn
INVENTORS
WILLIAM A. MURRAY
ELLA MAY MURRAY BABBITT
BY Munn & Co.
ATTORNEYS.

UNITED STATES PATENT OFFICE.

WILLIAM ALBERT MURRAY AND ELLA MAY MURRAY BABBITT, OF SANFORD, FLORIDA.

PIPE-MOLDING MACHINE.

No. 888,921.  Specification of Letters Patent.  Patented May 26, 1908.

Application filed August 21, 1907. Serial No. 389,488.

To all whom it may concern:

Be it known that we, WILLIAM A. MURRAY and ELLA MAY MURRAY BABBITT, citizens of the United States, residing at Sanford, in the county of Orange and State of Florida, have invented a new and useful Improvement in Pipe-Molding Machines, of which the following is a specification.

The object of our invention is to provide a simple, practical and easily constructed machine for molding pipes from hydraulic cement and especially small drain tile of 3 inch diameter by 12 inches long and it consists in the novel construction and arrangement of such machine and its several parts, whereby such pipe may be rapidly and cheaply formed as hereinafter fully described, with reference to the drawings, in which Figure 1 is a front elevation. Fig. 2 is a vertical section on line 2—2 of Fig. 1. Fig. 3 is a perspective view of the three parts of the mold casing. Fig. 4 is a perspective view of the means for locking the mold casing in the vertically reciprocating carriage, and Fig. 5 is an enlarged cross section through the boring bit.

In the drawing, A A A A are four tall posts or standards connected at the top and bottom by cross bars and mounted upon a base B of sills.

C C' C' is the mold casing in which the cement mortar is packed from which the pipe is to be formed. This mold casing is insertible in and vertically movable with a carriage frame D which slides in guides $a$ $a$ on the inner sides of two of the vertical standards A A.

E is a subjacent catch pan mounted stationary in the framework below the mold casing and F is a boring bit arranged vertically and concentrically within the catch pan in stationary bearings to rotate in a fixed horizontal plane and coaxially with the mold and designed to bore or drill a central hole through the mass of cement mortar in the mold whenever the latter is lowered and pressed down upon said bit. The catch pan E is for the purpose of catching the borings of soft cement mortar, so that they may be mixed up and used again in packing the mold for the next pipe without loss of material. For this purpose the catch pan has an outlet spout $b$ through its bottom which leads into a subjacent flat bottom trough G whence it is shoveled out onto the mixing board or into the mixing cylinder for mixing the mortar. On the shaft of the boring bit is rigidly attached, near the bottom of the catch pan, an arm or clearing paddle P which, as it revolves, sweeps out the borings through the discharge spout. The boring bit F has its working end pointing upwardly and its lower end is attached to a shaft $F^2$ provided with a gear wheel $f$ that meshes with and derives motion from a gear wheel $e$ on a horizontal shaft H. This shaft H is driven by power through a band wheel H', but may be turned by a crank, if desired.

The mold carriage D has at its lower end a flanged ring seat $d$ and at its upper end has a flanged ring cap $c$. The vertical flanges of the said cap and seat, $c$ and $d$, receive within them the mold casing and hold it against displacement while boring the central hole. To permit the mold casing to be put in place and removed from the carriage, the upper ring cap $c$ is hinged on one side at $c'$ and on the other side has a locking device by which it may be fastened down to hold the mold. This locking device consists of an upright spring bar $g$ fixed to an offsetting lug $h$ on the carriage, and a swinging hook $i$. The bar $g$ passes through a hole in the plate $c^2$ of the cap ring and said bar has a hole or notch into which the hook $i$ may be entered to hold the cap ring down to place, so as to firmly hold the mold casing C C' C' between the seat $d$ and cap $c$. When the cap ring is elevated, as in dotted lines in Fig. 4, the bent upper end of the spring bar holds the cap plate in elevated position so as to facilitate the insertion and removal of the mold. As the bar $g$ is made of spring material and passes through a hole in plate $c^2$ it binds against such plate with sufficient friction to hold the plate $c^2$ and cap $c$ in the elevated position. A hook on the top of bar $g$ prevents the plate $c^2$ from passing off the top of the bar.

Spanning the top of the cap ring $c$ is a yoke $j$ which by means of a link $k$ is connected to a lever $l$ fulcrumed to a cross bar between the rear pair of standards. To the upper ends of the carriage D, on each side, is attached a strong spiral spring $m$ and $m$, whose upper ends are connected to the top portion of the main frame. These springs balance the carriage and mold and normally hold the carriage and its mold casing in an elevated position, but when the lever $l$ is pulled down as in dotted lines in Fig. 2, the carriage is forced down against the tension of these springs and the mold, filled with cement mortar, is forced down upon the revolving boring bit and a central hole is bored through the mass of compacted cement to form the inner chamber of a pipe.

The boring bit is made of hollow sheet metal of tubular form, but open along one side with the leading and cutting edge $x$ of shorter radius than the trailing edge $y$ as seen in Fig. 5, which edge $y$ is arranged to press outwardly to an increased diameter as the bit rotates in the mortar and thus produces a double effect, first, the removal of the core of mortar, and secondly, the troweling of the inner walls of the mortar by the lateral expansion and pressure of the bit thereagainst from its wedging action. This compacts the mortar and makes the walls of the pipe dense, hard, and firm and free from all tendency to crack or crumble.

The mold casing, see Fig. 3, consists of a thin curved and elastic sheet C of steel having a lap of several inches the edges of which are loose or ununited save by the encompassing slip sleeves C' C'. These latter are rigid circular non-adjustable sleeves which surround the casing C at its opposite ends and have diametrical lugs, flanges or hand holds $n$, $n$, two to each sleeve, so placed that they may be seized to pull the sleeves off the casing. When so pulled off, the elasticity and unattached edges of the casing C allow it to expand and unroll slightly so as to loosen from adhesion, to the newly made cement pipe within without breaking or disfiguring the same. In loading the mold, the casing C is surrounded by the slip sleeves C' C' and the cement mortar is packed solidly therein by hand with a rammer, or by other means, until it is sufficiently dense to hold in the mold while being transported. The loaded mold is then placed in the carriage and the lever brought down to bore out the interior. When the mold is taken out, it is held in a horizontal position while the slip sleeves are being pulled off and then the inner casing C is tightly held and turned into vertical position and the newly made pipe is stood endwise on the drying board or floor.

The rigid or non expansible slip sleeves C' are cylinders of considerable length which embrace the inner elastic sheet C throughout the greater portion of its length, so that the said inner elastic sheet C is held against expansion and the distortion of the mold during the boring and expansive troweling action of the bit. The two diametrically opposite handle lugs of the slip sleeves are also important in enabling the slip sleeves to be pulled off in axial alinement without cramping and binding, as would be the case if the pulling-off strain were applied to one side only of the sleeve.

To steady the loaded mold when inserting it between the seat and cap of the carriage, a curved cross bar $o$ extends horizontally across the carriage near the upper end of the same.

A stop $p$ limits the upward movement of the carriage when raised by the springs, and a pivoted locking latch $q$ holds the carriage and its load up until it is ready to be depressed. This latch $q$ is then turned down and out of the way.

Although intended chiefly for small drain tile and pipe of small diameter, this machine may be used for larger sizes also, and various changes in construction and arrangement may be made without departing from our invention as set forth in the claims.

With a machine of the kind described four to five thousand of the smaller sizes of pipe may be made in one day.

We claim

1. A pipe molding machine, comprising a mold holder, a removable mold casing and a coaxial boring bit with one side open and its leading edge nearer the center than the trailing edge to compress and trowel the inner wall of the pipe.

2. A pipe molding machine comprising a vertically movable carriage, a removable mold casing contained therein, means for moving it vertically and a vertical rotating boring bit arranged to rotate in a fixed horizontal plane in coaxial relation to the mold casing, a subjacent receptacle for the borings surrounding the bit and a revolving arm attached to the boring bit shaft for discharging the borings.

3. A pipe molding machine comprising a rotating boring bit mounted in fixed bearings to rotate in a fixed horizontal plane and pointing upward and a vertically adjustable carriage arranged above the bit and made in two separable parts having a detachable mold casing between them and means for balancing the weight of the carriage and mold and raising and lowering the same.

4. A pipe molding machine comprising a rotating boring bit mounted in fixed bearings and pointing upward and a vertically adjustable carriage arranged above the bit and having a detachable mold casing, a catch pan surrounding the base of the bit and having a discharge spout and a clearing arm attached to the bit shaft.

5. A pipe molding machine comprising a rotating boring bit mounted in fixed bearings and pointing upward and a vertically adjustable carriage arranged above the bit and made in two separable parts having a detachable mold casing between them, means for raising the carriage and means for depressing the same.

6. A pipe molding machine comprising a rotating boring bit mounted in fixed bearings and pointing upward and a vertically adjustable carriage arranged above the bit and having a detachable mold casing consisting of a split and lapped cylinder and two sleeves, the said carriage having an annular seat at the bottom and an annular cap at the top made adjustable to and from each other and provided with locking devices for holding them together on the mold casing.

7. A mold for molding cement pipe, comprising a thin sheet metal casing having lapped but unattached edges, and two rigid encompassing slip sleeves of rigid continuous circular form each having opposite projections to form handles to pull them off the inner casing.

WILLIAM ALBERT MURRAY.
ELLA MAY MURRAY BABBITT.

Witnesses:
J. A. McDOWELL,
RICHD. H. MARKS.